United States Patent [19]
Lin

[11] Patent Number: 5,657,551
[45] Date of Patent: Aug. 19, 1997

[54] TAPELINE HAVING AN EASY-RELEASE STOP MECHANISM

[75] Inventor: Henry Lin, Shin Chung, Taiwan

[73] Assignee: Index Measuring Tape Co., Ltd., Taipei Hsien, Taiwan

[21] Appl. No.: 500,317

[22] Filed: Jul. 10, 1995

[51] Int. Cl.$^6$ .................................................. G01B 3/10
[52] U.S. Cl. ........................................ 33/767; 242/381.3
[58] Field of Search .................. 33/767, 755; 242/381.3, 242/381, 381.1

[56] References Cited

U.S. PATENT DOCUMENTS

| | | | |
|---|---|---|---|
| 4,899,460 | 2/1990 | Kang | 33/767 |
| 5,245,761 | 9/1993 | Waldherr | 33/767 |
| 5,395,069 | 3/1995 | Chen | 33/767 |

FOREIGN PATENT DOCUMENTS

| | | | |
|---|---|---|---|
| 253421 | 6/1926 | United Kingdom | 33/767 |
| 1188039 | 4/1970 | United Kingdom | 33/767 |

*Primary Examiner*—Christopher W. Fulton
*Attorney, Agent, or Firm*—Bacon & Thomas

[57] ABSTRACT

Disclosed is a tapeline having an easy-release stop mechanism, mainly including a casing, a metallic tape extendably wound and received in the casing, an easy-release stop mechanism provided at a bottom side of the casing, and an optional locking switch which may be provided at a front top corner of the casing. The easy-release stop mechanism is an elastic plate body having at one end a pivot shaft engaged into two shaft seats provided in the casing to allow the plate body to pivotally turn about the pivot shaft, at the other end a downward curved top surface and a downward projected actuating block just beneath the curved top surface to project from an opening formed at a bottom side of the casing for a user to push with fingers, and at a central top portion a raised stop block having a downward curved top surface, such that when the actuating block is pushed inward against the casing and makes the raised stop block to frictionally contact the wound metallic tape in the casing, the metallic tape is temporarily retained in place, and when the actuating block is released the metallic tape is immediately allowed to retract into or be further extended from the casing.

2 Claims, 3 Drawing Sheets

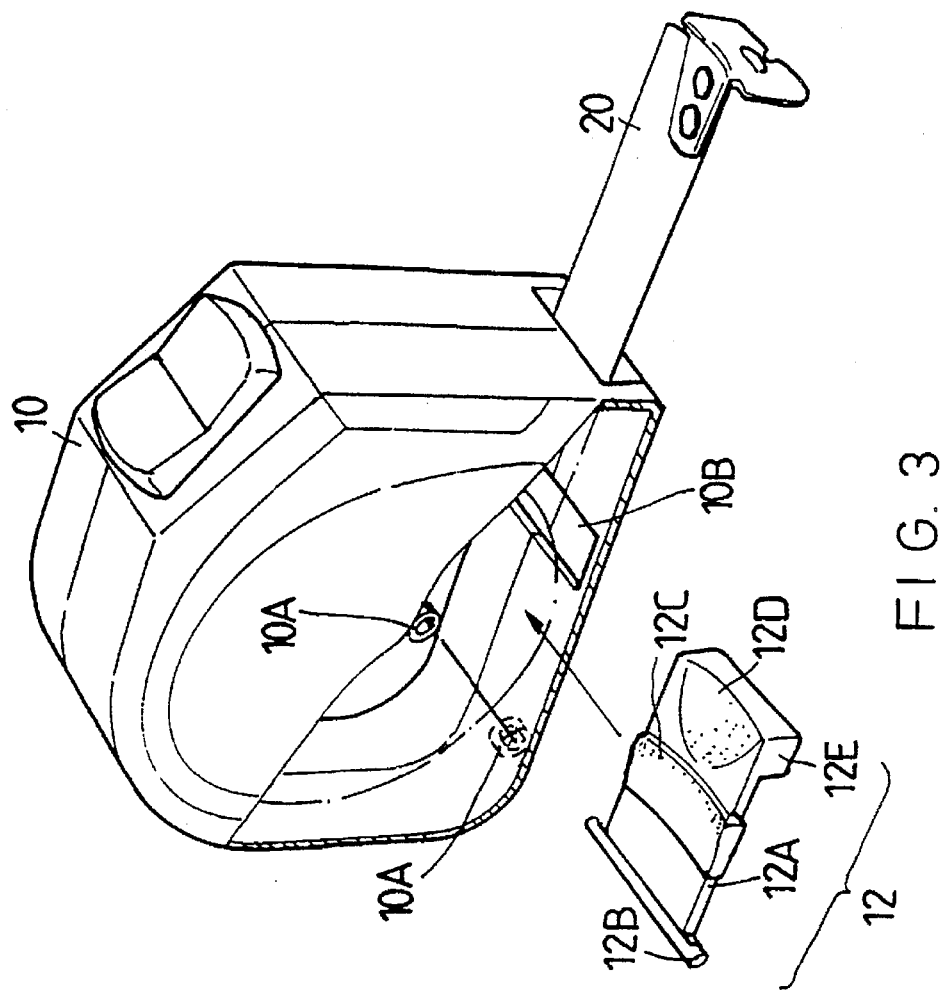

TAPELINE HAVING AN EASY-RELEASE STOP MECHANISM

BACKGROUND OF THE INVENTION

1. Field of the Invention

The present invention relates to a tapeline having an easy-release stop mechanism, and more particularly to a tapeline having a locking mechanism which can be used to effortlessly lock and easily release a tapeline when the same is used in measuring something.

2. Description of the Prior Art

FIG. 1 illustrates a conventional tapeline which mainly includes a casing 100 having a locking switch 101 provided near a top portion thereof and a metallic tape 200 extendably received in the casing 100. The locking switch 101 can be used to temporarily hold the extended metallic tape 200 to a desired length. However, to save the trouble of time-consuming operation of the locking switch 101, a user might use a finger, usually the index finger, to replace the locking switch 101 in holding the extended metallic tape 200 by pressing the finger on a bottom side of the extended metallic tape 200 against the casing 100, as shown in FIG. 1. The disadvantages by doing so are as follows:

1. The pressing of a finger on the bottom side of the metallic tape 200 shall unduly push and/or deform the tape surface thereof and thereby adversely affects the accuracy and precision of measuring.
2. The finger pressing on the metallic tape 200 is easily dangerously cut and injured by the rather sharp edges of the metallic tape.
3. The metallic tape 200 tends to be bent under the pressure exerted by the finger on the tape and is therefore subject to an earlier break.

The inventor has developed a tapeline having an easy-release stop mechanism to eliminate the above-mentioned disadvantages existed in a conventional tapeline.

SUMMARY OF THE INVENTION

A primary object of the present invention is to provide a tapeline which has, in addition to a conventional locking switch, an easy-release stop mechanism to stop and/or release an extended metallic tape of the tapeline in just a second. The extended metallic tape can be temporarily held to a desired length without the need of pressing a bottom side thereof with a finger and thereby adversely affecting the measuring accuracy thereof.

Another object of the present invention is to provide a tapeline having an easy-release stop mechanism which can be easily operated with a finger to temporarily stop an extended metallic tape without the risk of dangerously cutting the finger by the sharp edges of the metallic tape.

A further object of the present invention is to provide a tapeline having an easy-release stop mechanism with which an extended metallic tape can be temporarily stopped to a desired length without being pushed, bent, and deformed which is usually found when the tape is stopped by a pressing finger and will cause undesired early breaking of the tape.

BRIEF DESCRIPTION OF THE DRAWINGS

The detailed structure, applied principle, function and effects of the present invention can be best understood by referring to the following detailed description of the preferred embodiment and the accompanying drawings, wherein

FIG. 3 is a partially exploded perspective side view of the tapeline of the present invention, wherein the easy-release stop mechanism is separated from a casing of the tapeline to better show its structure;

FIG. 4 is a side view of the tapeline of the present invention, a part of which is cut away to clearly show the operation of the easy-release stop mechanism;

FIG. 4A is an enlarged view of a portion of the cut away part shown in FIG. 4.

DETAILED DESCRIPTION OF THE PREFERRED EMBODIMENT

Figure 2:
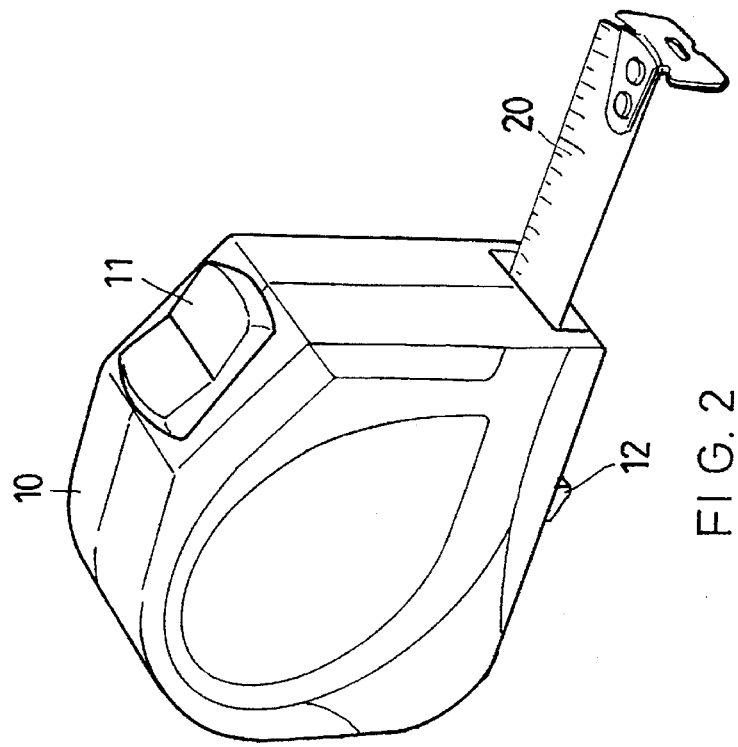
FIG. 2 is a perspective view showing a tapeline having an easy-release stop mechanism according to the present invention.
Figure 1:
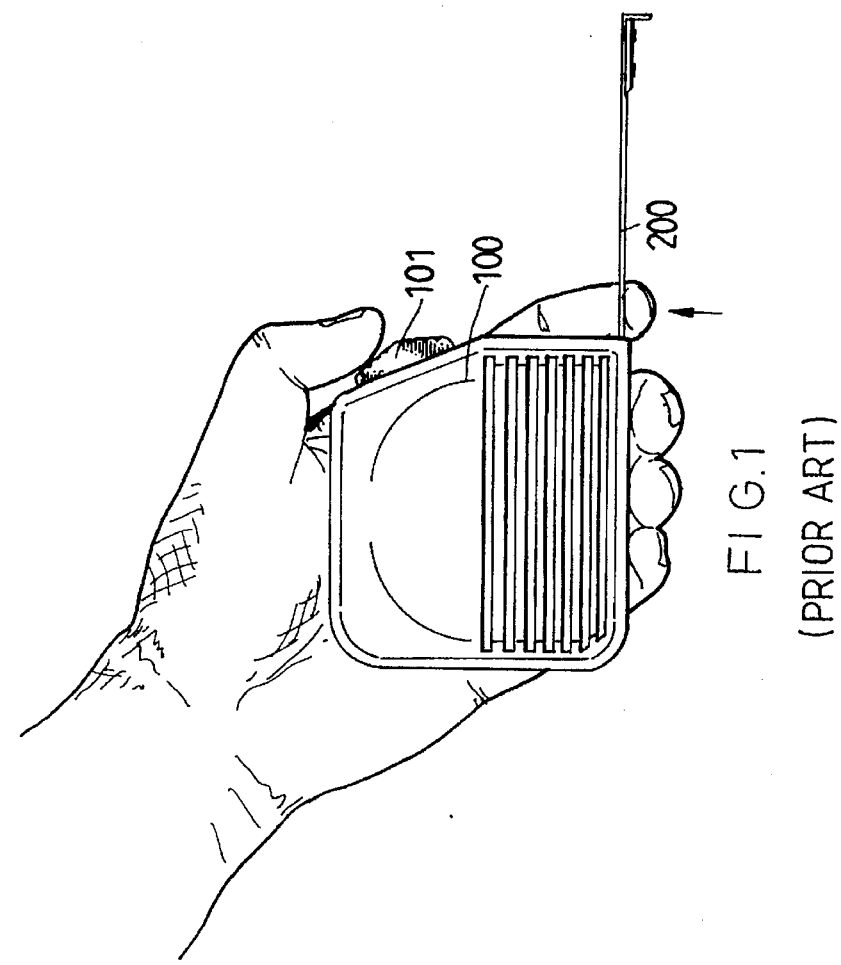
FIG. 1 shows a conventional tapeline having a locking mechanism for stopping an extended metallic tape at a desired position.

Please refer to FIG. 2. The present invention is a tapeline including a casing 10, a metallic tape 20 extendably wound and received in the casing 10, a locking switch 11 provided near a front top corner of the casing 10, and an easy-release stop mechanism 12 provided at a bottom side of the casing 10.

Please further refer to FIG. 3, in which the easy-release stop mechanism 12 is separated from the casing 10 to better show the structure thereof. As shown in FIG. 3, the easy-release stop mechanism 12 has an elastic plate body 12A which is so formed that a first end 12B thereof serves as pivot shaft, a second end opposite to the first end 12B has a downward curved top surface 12D and a downward projected actuating block 12E just beneath the curved top surface 12D, and a stop block 12C having a downward curved top surface is raised from a central top portion of the plate body 12A. The top surface of the stop block 12C has a curvature the same as that of an outer circumferential periphery of the wound metallic tape 20 in the casing 10. Two ends of the pivot shaft at the first end 12B of the plate body 12A are engaged into two shaft seats 10A provided at two inner sidewalls of the casing 10, such that the plate body 12A is pivotally turnable about the pivot shaft 12B relative to the casing 10 with the actuating block 12E below the plate body 12A projecting from an opening 10B formed at a bottom side of the casing 10 at a point conveniently accessible by a finger, especially an index finger of the user.

When the actuating block 12E of the easy-release stop mechanism 12 is pushed toward the casing 10, as shown in FIG. 4, the plate body 12A is pivotally turned about the pivot shaft 12B in a direction toward the metallic tape 20 wound in the casing 10 with two raised lateral ends of the downward curved stop block 12C fitly pressing against two outer edges of the wound tape 20. The metallic tape 20 is temporarily retained to a fixed position under the frictional contact of it with the stop block 12C. When the actuating block 12E is released, its weight, which is made heavier than that of the first end 12B of the plate body 12A, causes the whole plate body 12A to pivotally decline in a natural way. The easy-release stop mechanism 12 returns to its unlocked position.

Figure 5:
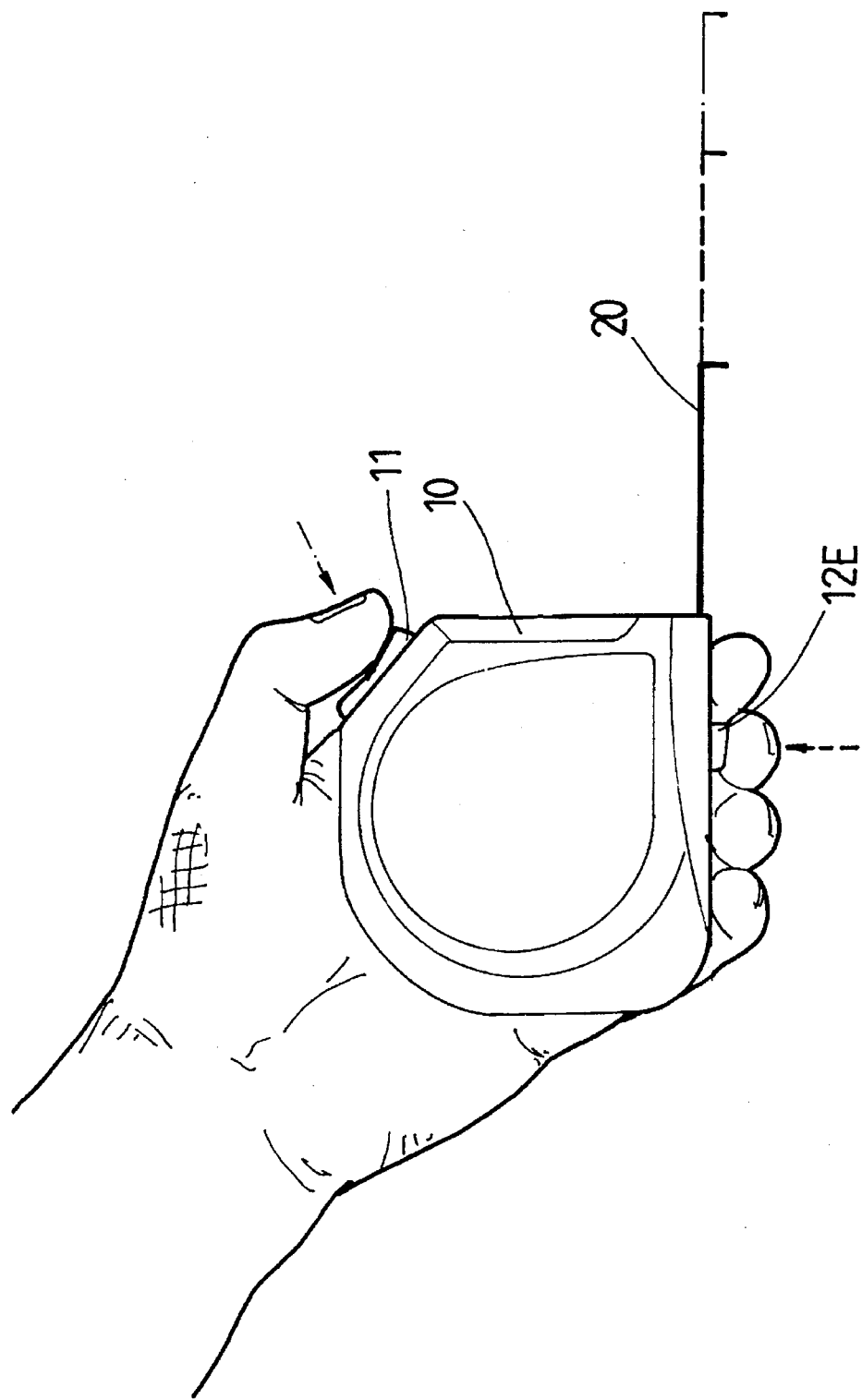
FIG. 5 illustrates the manner in which the ease-release stop mechanism of the tapeline is operated.

FIG. 5 illustrates a tapeline of the present invention in use. As shown, in addition to the locking switch 11 provided on the front top portion of the casing 10 for fixing the extended metallic tape 20 to a desired length, the actuating block 12E of the easy-release stop mechanism 12 projected from the bottom of the casing 10 can be optionally pushed inward at any time to temporarily stop the extended metallic tape 20 from further extending or retracting.

From the above arrangements, it can be seen the extended metallic tape of the tapeline having an easy-release stop mechanism according to the present invention can be conveniently temporarily held in place without the risk of cutting the user's finger or adversely bending, deforming or even breaking the tape and therefore affecting the accuracy of measuring.

It is to be understood that the form of the invention shown and disclosed is to be taken as a preferred embodiment of the invention and that various changes in the shape, size, and arrangement of parts may be resorted to without departing from the spirit of the invention or the scope of the subjoined claims.

What is claimed is:

1. A tapeline having an easy-release stop mechanism, comprising a casing, a metallic tape extendably wound and received in said casing, and an easy-release stop mechanism provided at a bottom side of said casing, said easy-release stop mechanism having an elastic plate body which is so formed that a first end thereof serving as a pivot shaft is engaged into two shaft seats provided at two inner sidewalls of said casing to allow said plate body to pivotally turnable about said pivot shaft relative to said casing, a second end opposite to said first end has a downward curved top surface and a downward projected actuating block just beneath said curved top surface and projecting from an opening formed at a bottom side of said casing for a user to easily access with fingers, and a stop block having a downward curved top surface is raised from a central top portion of said plate body, whereby when said actuating block of said easy-release stop mechanism is pushed toward said casing, said plate body is pivotally turned about said pivot shaft in a direction toward said metallic tape wound in said casing with two raised lateral ends of said downward curved stop block fitly frictionally contacting with two outer edges of said wound metallic tape and thereby temporarily retaining said metallic tape to a fixed position without retracting into or being further extended out of said casing, and when said actuating block is released to disengage said easy-release stop mechanism from said wound metallic tape, said metallic tape is allowed to retract or be extended again.

2. A tapeline having an easy-release stop mechanism as claimed in claim 1, wherein said tapeline is provided at a front top corner of said casing with an ordinary locking switch for holding said metallic tape in place at a desired extended length for a prolonged time period without always pressing said easy-release stop mechanism against said casing.

* * * * *